United States Patent [19]
Faust

[11] Patent Number: 5,515,812
[45] Date of Patent: May 14, 1996

[54] CAT LITTER BOX WITH REMOVABLE LITTER SCREEN

[76] Inventor: Ann Faust, 614 E. 33rd Pl., Chicago, Ill. 60616

[21] Appl. No.: 237,171

[22] Filed: May 3, 1994

Related U.S. Application Data

[63] Continuation-in-part of Ser. No. 838,002, Feb. 21, 1992, abandoned.

[51] Int. Cl.[6] ................................................. A01K 1/035
[52] U.S. Cl. ................................................................. 119/166
[58] Field of Search ..................................... 119/166, 167

[56] References Cited

U.S. PATENT DOCUMENTS

| | | | |
|---|---|---|---|
| 2,963,003 | 12/1960 | Oberg et al. | 119/166 |
| 2,971,493 | 2/1961 | Robb | 119/166 |
| 3,246,630 | 4/1966 | Dearing et al. | |
| 3,476,083 | 11/1969 | Vander Wall | 119/166 |
| 4,325,325 | 4/1982 | Larter | 119/166 |
| 4,771,731 | 9/1988 | Derx et al. | |
| 5,211,133 | 5/1993 | Foley | 119/166 |
| 5,293,837 | 3/1994 | Caldwell | 119/166 |

FOREIGN PATENT DOCUMENTS 2934811  3/1980  Germany ................................. 119/166

*Primary Examiner*—Robert P. Swiatek
*Attorney, Agent, or Firm*—Kimmel, Crowell & Weaver

[57] ABSTRACT

A pet litter box includes a waterproof pan having a closed bottom, diverging walls and an open top bounded by a rim, a rack having a liquid-permeable planar portion and a plurality of hangers including inverted-U bights which extend over the rim of the pan so as to suspend the rack within the pan, substantially above the bottom of the pan. The bights are interconnected by elements wholly outside the pan, whereby rack can be lifted from the pan. Litter is spread on a screen having a frame conforming to the interior contour of the pan above the level of the rack. Liquid waste can percolate through the litter to the bottom of the pan.

5 Claims, 2 Drawing Sheets

CAT LITTER BOX WITH REMOVABLE LITTER SCREEN

This is a continuation-in-part of application Ser. No. 07/838,002, filed Feb. 21, 1992, now abandoned.

BACKGROUND OF THE INVENTION

This invention relates generally to animal husbandry and more particularly to a pet litter box with a removable litter screen.

Unconfined indoor pets such as cats require sanitary facilities. Prior patents disclose many different design approaches for litter boxes, some of awesome complexity; however, the most common arrangement remains a simple open-topped box or pan, usually made of plastic, in which one places a quantity of absorbent granular material. Pets who find this arrangement attractive tend to perform their excratory functions in the proper place.

Upon entering a home occupied by cats, a stranger may notice the odor, even when pet sanitary facilities are carefully maintained. Changing the litter often helps keep odors down; but frequent maintenance drives up litter costs and the inconvenience of toting bags of litter home from the store. For many people, pet box cleaning is a low-priority chore that tends to get put off. But eventually, the litter winds up in the trash, contributing to the volume of the country's burgeoning landfills.

It would be desirable to provide pet owners with a litter box which dramatically reduced litter consumption, but was nevertheless attractive to pets and relatively odor-free. Consistent with the goal of economy and ease, such a box should be both inexpensive and simple to maintain.

Some prior inventors have taken the approach of the present invention, by providing a box or pan with a screen or grate that supports the litter. This way, wet litter does not sit on the bottom of the pan—air can circulate beneath the litter to keep it drier. One such device is described by inventor Van der Wall in U.S. Pat. No. 3,476,083, which depicts a pan-within-a-pan arrangement. The upper pan has an entirely open bottom. A grate is seated just above the bottom, and a screen is supported by the grate. Litter is spread on the screen. A number of other patents follow this general approach.

Each of the prior patents of which I am aware is unnecessarily complicated; others would be difficult or inconvenient to servicer or are commercially impractical.

SUMMARY OF THE INVENTION

An object of the invention is to simplify the design of a screen-type pet litter box, making it simple to manufacture and to service.

This and other objects are attained by a cat litter box comprising a waterproof pan having a closed bottom, diverging walls and an open top bounded by a rim, a rack having a liquid-permeable planar portion and a plurality of hangers including inverted-U bights which extend over the rim of the pan so as to suspend the rack within the pan, substantially above the bottom of the pan, pairs of said bights being interconnected by elements wholly outside the pan, whereby rack can be lifted from the pan, and a screen having a frame conforming to the interior contour of the pan above the level of the rack, said screen having a mesh size sufficiently small to support a volume of cat litter thereon, while allowing liquid waste to percolate through to the bottom of the pan.

I have found that pet urine can be permitted to percolate through the litter into the pan below, so that only the liquid waste can be discarded, if desired. I reduce odors from the urine by periodically adding some diluted bleach, and on occasion, after removing the litter screen from the pan, pour out any collected liquid. I have actually found that with the present invention, the litter material does not have to be particularly water absorbent. In fact, small gravel or other non-absorbent reusable aggregate may be used. Such aggregate can be rinsed or washed from time to time, and reused indefinitely.

BRIEF DESCRIPTION OF THE DRAWINGS

In the accompanying drawings.

DESCRIPTION OF THE PREFERRED EMBODIMENT

Figure 1:
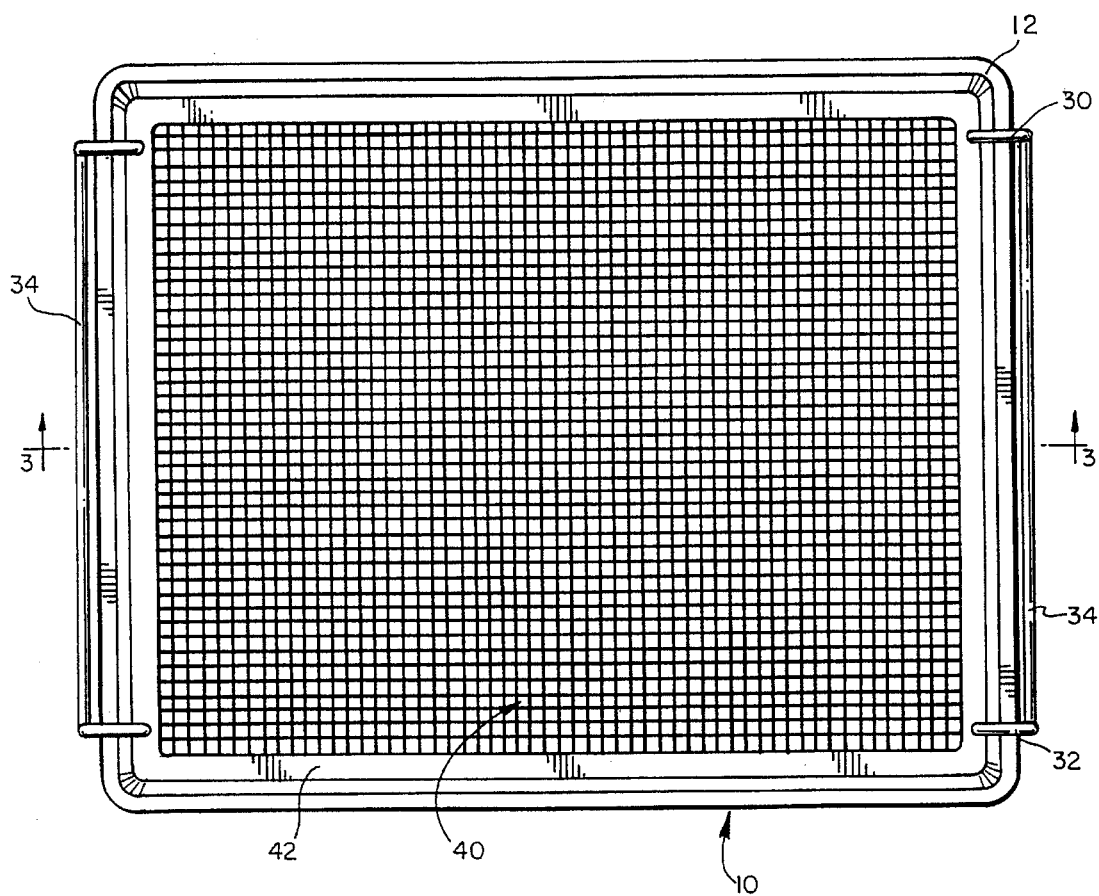
FIG. 1 is a top plan view of a cat litter box with removable litter screen embodying the invention.
Figure 3:
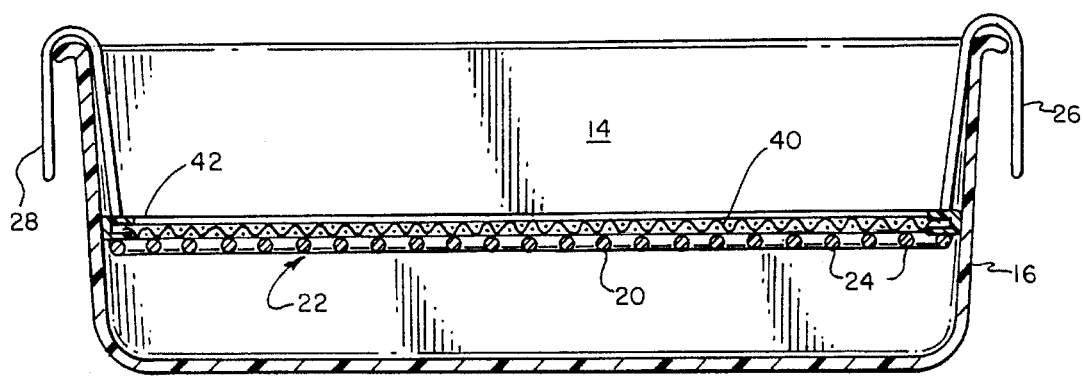
FIG. 3 is a sectional view, taken on the vertical bisecting plane represented by line 3—3 in FIG. 1.
Figure 2:
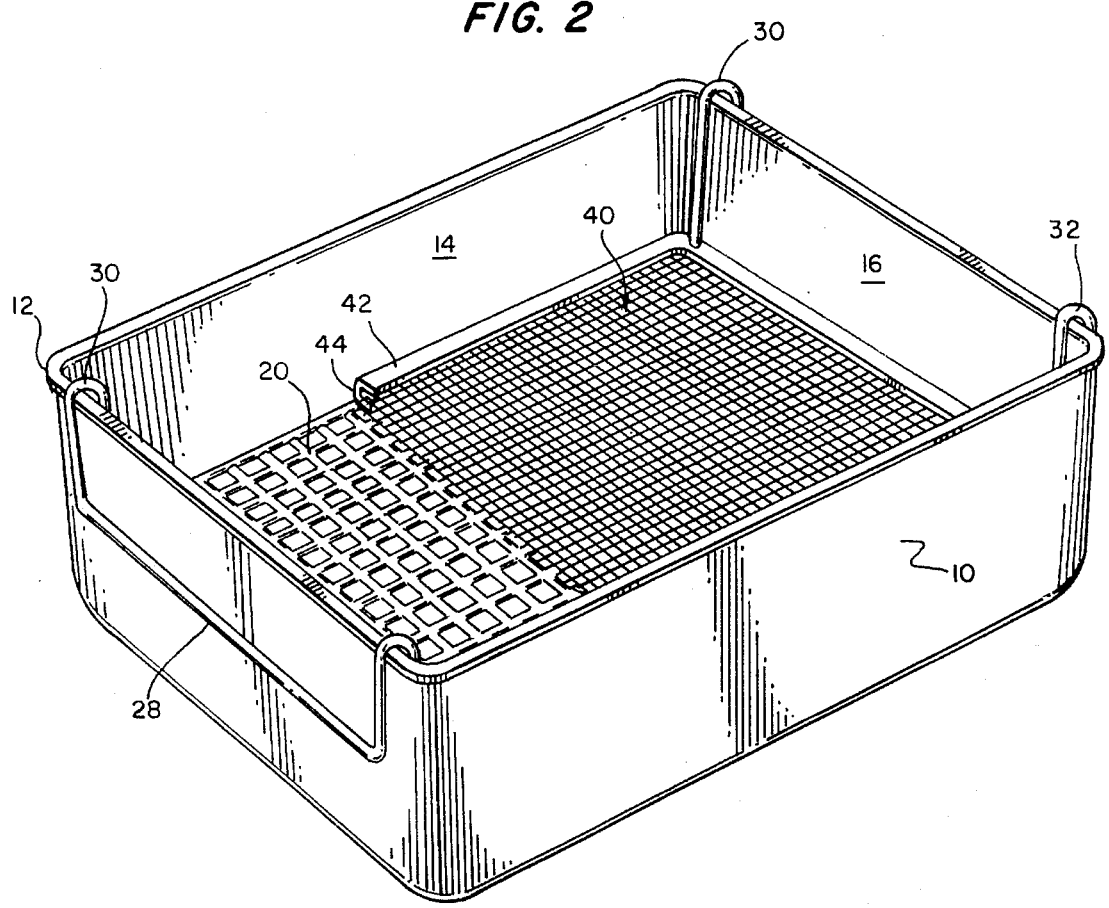
FIG. 2 is an isometric view, looking down on the box from the front.

A cat litter box embodying the invention includes a shallow open-topped pan or tray 10 made of a waterproof polymeric material, and having a rim 12 extending outwardly from its upper periphery, to facilitate handling. The pan is preferably an inexpensive off-the-shelf item having diverging side and end walls 14,16.

To suspend litter above the bottom of the pan, a wire rack or grate 20 is suspended from opposite sides of the pan. The grate includes a horizontal, planar portion 22 made of wires or other members having sufficient strength to support a pet of the size apt to use the device. By this, I mean both that the rack is not subject to mechanical failure, and is sufficiently rigid that the rack does not bow, under the weight of the animal, so much that the center of the rack touches to the bottom of the pan. Larger racks must be disproportionately stronger, both because their span is greater, and because greater loading from larger animals will be anticipated. The rack shown has crossing wires 24 defining approximately one-inch squares.

Hangers 26,28 made of wire are affixed to opposite ends of the rack. Each hanger comprises a pair of inverted-U bights 30,32, each of which goes up and over the rim of the pan. The outer ends of the respective bights are interconnected by a horizontal wire segment 34. The horizontal segments, as they remain outside of the pan at all times, provide two clean handles by which the rack can be lifted from the pan. The handles lie slightly above the planar portion of the rack. Either the handles are formed separately, and attached to the planar portion by adhesive or another fastening method, or they may be formed integrally with the rack's wires.

For long life, the rack should be non-corrodible and washable. I presently prefer a vinyl-coated steel wire construction; however, enamels or other coatings may prove satisfactory. Alternatively, the coating could be omitted, if the rack were constructed of a plated metal, a non-corrosive metal such as stainless steel, or even entirely of a strong polymeric substance, which might be reinforced with fibers, for added bending stiffness.

A fine-mesh screen 40, which actually supports the litter or aggregate material, is stretched taut on a frame 42 shaped to conform to the inner profile of the pan at about its horizontal mid-plane. The outer edge 44 of the frame tapers upward and outward at a slight angle, matching the divergence angle of the pan walls 16,18. The screen is affixed to the frame by staples, adhesives, or other functionally equivalent means. Since the frame is thicker than the screen it supports, the screen in nominally out of contact with the rack, although it may sag under loading. Both the screen and the frame are non-corrodible and washable.

In use, a small amount of dilute bleach or other antiseptic is poured into the pan. Then, the rack is suspended from the rim of the pan by looping the handles over either end of the pan. The screen is then placed upon the rack, and a bed of litter is poured onto the screen. It is best to use only a modest thickness of litter, as too much litter tends to retain wetness. The device is then placed on the floor in an out-of-the-way location. Urine which strikes the litter may be absorbed, but a portion of it may percolate through, collecting in the bottom of the pan. I have found this is not objectionable. Actually, it is an advantage, since (after removing the screen and grate), the liquid waste can be poured out of the pan. The pan is then refreshed with new antiseptic, and the litter material replaced or cleaned. The aggregate can be kept relatively clean by raking it to remove feces occasionally, and by spraying it with an antiseptic/deodorizer such as chlorine bleach.

Since the invention is subject to modifications and variations, it is intended that the foregoing description and the accompanying drawings shall be interpreted as illustrative of only one form of the invention, whose scope is to be measured by the following claims.

I claim:

1. A pet litter box comprising a waterproof pan having a closed bottom, diverging walls open top bounded by a rim, a rack having a liquid-permeable planar portion and a plurality of hangers including inverted-U bights which extend over the rim of the pan so as to suspend the rack within the pan, substantially above the bottom of the pan, pairs of said bights being interconnected by elements wholly outside the pan, whereby the rack can be lifted from the pan, and a screen having a frame conforming to the interior contour of the pan above the level of the rack, said screen having a mesh size sufficiently small to support a volume of cat litter thereon, while allowing liquid waste to percolate through to the bottom of the pan, wherein the edges of the screen frame are tapered at an angle like that of the diverging walls, so that the frame seats against said walls.

2. The invention of claim 1, rein said frame is substantially thicker than said screen.

3. The invention of claim 1, wherein the liquid permeable portion of the rack is a lattice of crossing wires.

4. The invention of claim 3, wherein said wires are steel wires covered with a protective coating.

5. The invention of claim 4, wherein the coating is vinyl.

\* \* \* \* \*